US008693401B2

(12) United States Patent
Lim et al.

(10) Patent No.: US 8,693,401 B2
(45) Date of Patent: Apr. 8, 2014

(54) METHOD AND SYSTEM FOR OPTIMIZED HANDLING OF CONTEXT USING HIERARCHICAL GROUPING (FOR MACHINE TYPE COMMUNICATIONS)

(75) Inventors: Heeseon Lim, Cupertino, CA (US); Nishi Kant, Fremont, CA (US)

(73) Assignee: Connectem Inc., Santa Clara, CA (US)

( * ) Notice: Subject to any disclaimer, the term of this patent is extended or adjusted under 35 U.S.C. 154(b) by 138 days.

(21) Appl. No.: 13/553,772

(22) Filed: Jul. 19, 2012

(65) Prior Publication Data

US 2013/0021972 A1  Jan. 24, 2013

Related U.S. Application Data

(60) Provisional application No. 61/509,878, filed on Jul. 20, 2011.

(51) Int. Cl.
*H04W 4/00* (2009.01)
(52) U.S. Cl.
USPC ............ 370/328; 370/329; 370/331; 370/332
(58) Field of Classification Search
USPC .......................................................... 370/328
See application file for complete search history.

(56) References Cited

U.S. PATENT DOCUMENTS

| | | | | |
|---|---|---|---|---|
| 8,335,517 B2 * | 12/2012 | Yu ................................. | 455/453 |
| 8,359,383 B2 * | 1/2013 | Sung et al. .................... | 709/223 |
| 8,369,527 B2 * | 2/2013 | Carmeli et al. ............... | 380/278 |
| 8,493,935 B2 * | 7/2013 | Zisimopoulos ............... | 370/331 |
| 2006/0014535 A1 * | 1/2006 | Walker et al. ................. | 455/433 |
| 2006/0190552 A1 * | 8/2006 | Henze et al. .................. | 709/216 |
| 2006/0221933 A1 * | 10/2006 | Bauer et al. ................... | 370/352 |
| 2008/0159139 A1 * | 7/2008 | Smith et al. ................... | 370/231 |
| 2008/0227434 A1 * | 9/2008 | Nitta et al. .................. | 455/414.1 |
| 2009/0156213 A1 * | 6/2009 | Spinelli et al. ............... | 455/436 |
| 2009/0196300 A1 * | 8/2009 | Carle et al. ................... | 370/400 |
| 2010/0216484 A1 * | 8/2010 | Zhou et al. ................... | 455/450 |
| 2010/0232353 A1 * | 9/2010 | Hu et al. ....................... | 370/328 |
| 2011/0185397 A1 * | 7/2011 | Escott et al. ...................... | 726/3 |
| 2012/0195234 A1 * | 8/2012 | Cai et al. ...................... | 370/259 |
| 2012/0195325 A1 * | 8/2012 | Connelly et al. ............. | 370/432 |
| 2013/0201987 A1 * | 8/2013 | Lu et al. ....................... | 370/390 |
| 2013/0286946 A1 * | 10/2013 | Zisimopoulos ............... | 370/328 |

OTHER PUBLICATIONS

IEEE Standard 802.1X, Feb. 5, 2010, IEEE Computer Society, 2010.*
IEEE Standard 802.11, Jun. 12, 2007, IEEE Computer Society, 2007.*

* cited by examiner

*Primary Examiner* — Ian N Moore
*Assistant Examiner* — Lakeram Jangbahadur

(57) ABSTRACT

A hierarchical data structure for signaling and data handling at a packet core network is defined. A hierarchical data structure is applied to both persistent and dynamic information to support a type of devices that share the same characteristics. Subscription database, context information, and policy rule information is comprised of group level information and device level information. Group level information contains the information the devices that belong to the group share. Device level information contains the device specific information that is different from group level information. When a device belonging to a group requests access to a packet network or performs a procedure that changes the mobility or session state of the device, context management unit works with authentication unit, subscription database unit, and policy decision unit to construct a right information for the device to handle the control and user data traffic.

15 Claims, 5 Drawing Sheets

METHOD AND SYSTEM FOR OPTIMIZED HANDLING OF CONTEXT USING HIERARCHICAL GROUPING (FOR MACHINE TYPE COMMUNICATIONS)

CROSS REFERENCE TO RELATED APPLICATIONS

The present application claims the benefit of U.S. Provisional Application No. 61/509,878, filed on Jul. 20, 2011 by the present inventors, which is herein incorporated by reference.

FIELD OF THE INVENTION

The present invention relates generally to mobile wireless networks which includes general packet radio service (GPRS) networks, UMTS and LTE. Specifically, this invention relates to a method for optimizing the information storage and context handling at a third generation partnership project (3GPP) core network for machine to machine type communications which has different characteristics of human communications through hierarchical context handling.

BACKGROUND

The GPRS or universal mobile telecommunications system (UMTS) is an evolution of the global system for mobile communications (GSM) standard to provide packet switched data services to GSM mobile stations. Packet-switched data services are used for transmitting chunks of data or for data transfers of an intermittent or bursty nature. Typical applications for 3GPP packet service include Internet browsing, wireless e-mail, video streaming, and credit card processing, etc. used by human users.

Organizations both private & government that are Local & Global are looking for new and innovative ways to manage their business & operations at an optimum cost structure. There are many use-cases including disaster management, lifestyle, telematic, performance management and remote monitoring where sensors with communication capability could be effectively used. However for such use cases to be mass adopted the cost of connectivity needs to drop down significantly. One place to gain significant efficiency is to access and process the connection/device related data in an optimized way.

These new applications and markets aim to take advantage of ubiquitous cellular coverage. Even though the underlying radio technology continues to evolve from 2G, 2.5G, 3G and now LTE, new innovation is being developed to take advantage of this infrastructure in the form of smart devices and sensors that are creating new market opportunities for Mobile Network Operators (MNO's). Cellular networks with predictable and mature connectivity model are ideal for connecting millions of data collecting devices to the processing infrastructure. The opportunity to connect millions and even billions of devices is creating an exciting market opportunity commonly defined as M2M.

However, as MNO's look to seize this new market opportunity, there are many challenges in using the same architecture and practices that were designed for a very different human consumer market. The cost structure is fundamentally different, the relationship with the Enterprise is fundamentally different and the impact on the network from non-human devices is fundamentally different.

Most machine to machine offerings currently in the market treat the cellular network as a transport pipe. While this approach is simple and can be deployed using existing cellular infrastructure, it ignores the fact that machine type communication needs are inherently different than those for a human subscriber. Furthermore, a lot of machine type communication is more signaling intensive than data intensive; i.e. the amount of data that is communicated between the device and the network is often times very small and there is a huge signaling overhead in sending small size data. As the number of connected devices goes up, the network would succumb to signaling overload and possible other forms of congestion.

FIG. 1 is a block diagram illustrating typical machine to machine type communications over GPRS network architecture. Referring to FIG. 1, machine type devices 102-103 are communicatively coupled to a packet core network 110, in the same way as the human user devices 101 are coupled to a packet core network 110. For example, machine type device 101 is coupled to the core network 110 via a 3G Radio access network through e.g. nodeB or NB 104 and radio network controller (RNC) 105. Machine type device 103 is coupled to the core network 110 via a corresponding long term evolution (LTE) access network (e.g., evolved UMTS terrestrial RAN (E-UTRAN) node B or eNB) 106. In order to communicate to a machine server located in other networks such as Internet 120 and/or Enterprise premise 121, machine type devices 102-103 have to go through core network 110. Typically, core network 110 includes a serving GPRS support node (SGSN) 111 for 3G network or serving gateway (S-GW) 113 for LTE network 107 and a gateway GPRS support node (GGSN) 112 for 3G network or packet data network (PDN-GW) 114 for LTE network. These SGSN 111/S-GW 113 and GGSN 112/PDN-GW 114 relay communications between a machine type UE 102-103 and a destination (e.g. Enterprise server) 120-121. A typical core network also includes a home location register (HLR) or home subscriber server (HSS) 115 storing subscription profile and a policy and charging rule function (PCRF) 116.

Based on a statistics of machine to machine communications, there will be billions of connected devices in a few years and this will result in significant increase in amount of signaling and amount of data storage needed for keeping the persistent data and dynamic context of each session. In terms of data storage, due to hierarchical architecture of network, there is a lot of duplication in the network to store these data. For example, most of information is duplicated in home location register (HLR), serving GPRS support node (SGSN), and gateway GPRS support node (GGSN). With the increase in number of connected devices, the built-in hierarchy in the existing architecture results in more investment in the core network to support the storage and duplicate of information for all those devices. This also does not take the group nature of devices into consideration. As most of these devices share the same characteristics compared to individual human users, many of the information parameters are repeated for each device, making each core network node even more inefficient.

SUMMARY OF THE DESCRIPTION

A hierarchical structure of information storage in a core network node is defined. First level of the hierarchical structure stores the common nature of group of devices, which is applied in the same way to all the devices belonging to the group. This group level information has a group ID as an identifier tied with characteristics. Second level of hierarchical structure stores the device-specific information for each device. This device level information has a device identifier and one or more group identifiers this device belongs to, together with device specific information the group level information does not have. The device level information can also override the group level information. When there is any request for communication with a device, a correlating logic will get the device ID from the signaling and get all the necessary information by fetching group level and device level information and correlating these two to construct complete information for this device.

This type of grouping can happen at each network node or even further consolidated into one network node. This invention supports both modes. Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

According to some embodiment, a mechanism is provided to group the subscription and context information in a hierarchical manner reducing the need for duplicating the information and thus saving resources (e.g., persistent storage and dynamic memory space) and handling the data more efficiently. In one embodiment, a virtual optimized core (VOC) is configured to handle all the procedures to support mobility/session management, authentication/authorization, and data processing for the machine type devices as one logical core network node. The VOC includes the control plane and user plane processing functionalities and the subscription data/policy data storage functionalities to support the aforementioned procedures.

Figure 1:
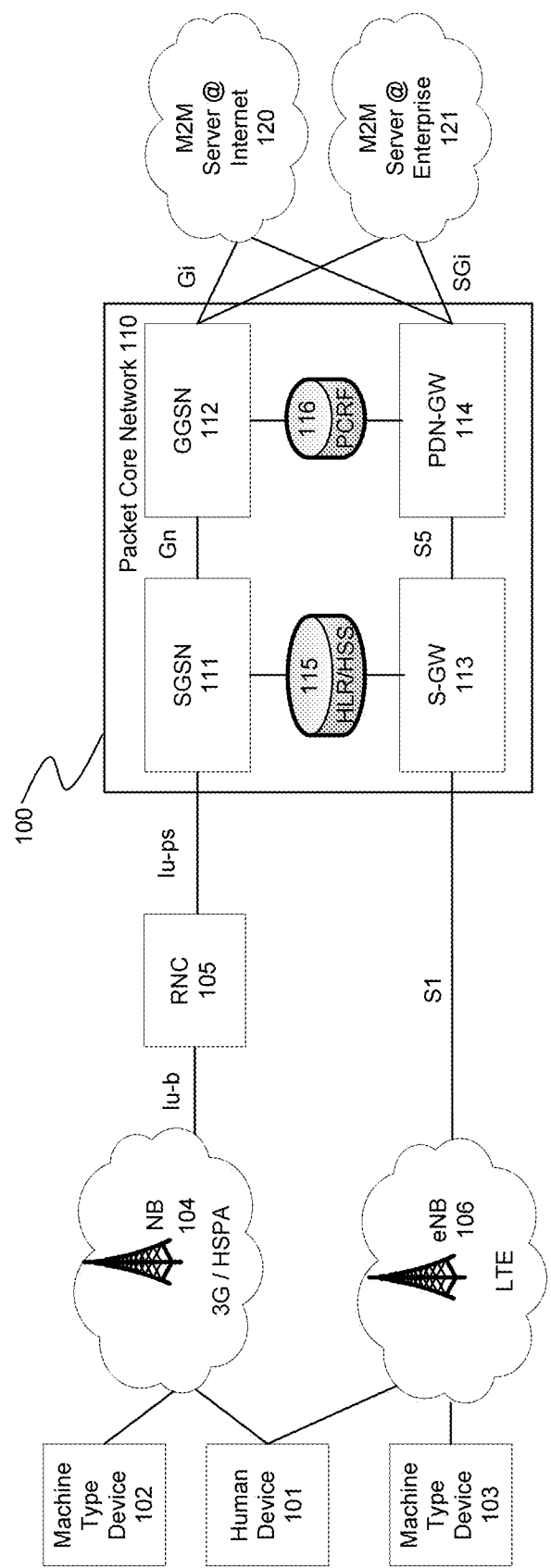
FIG. 1 is a block diagram illustrating machine type communications over typical 3GPP packet core and how the information is stored.
Figure 2:
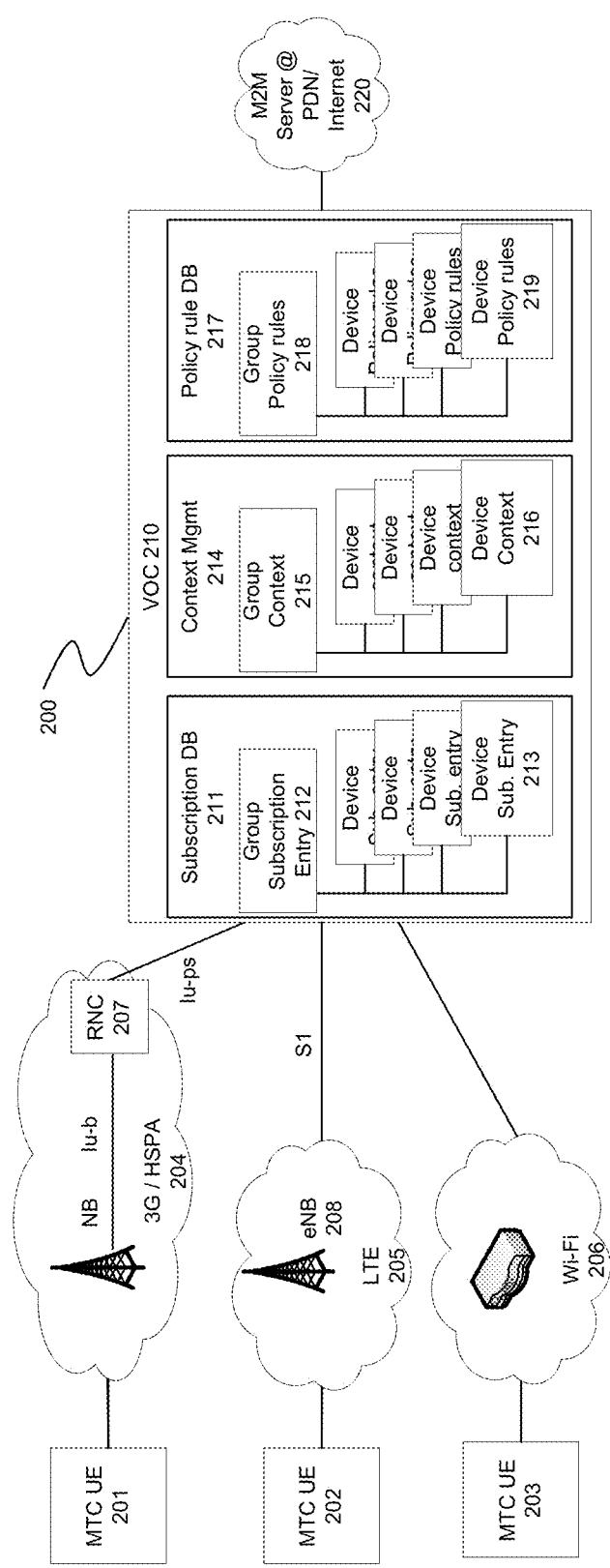
FIG. 2 is a block diagram illustrating system according to one embodiment.

FIG. 2 is a block diagram illustrating a network configuration according to one embodiment of the invention. Referring to FIG. 2, user equipments for machine type communications (MTC UEs) 201-203 are communicatively coupled to a virtual optimized core (VOC) 210 having collapsed core network functionality with hierarchical information and context grouping via various access networks to communicate with machine type communication servers (MTC servers) 220. For example, MTC UE 201 is coupled to the VOC 210 via a corresponding 3G radio access network (3G RAN) 204. MTC UE 202 is coupled to the VOC 210 via a corresponding long term evolution (LTE) access network 205 (e.g., evolved UMTS terrestrial RAN (E-UTRAN) node B or eNB). MTC UE 203 is coupled to the VOC 210 via a corresponding Wi-Fi access network 206.

As VOC 210 is self-contained core network realization containing all the core network functionalities including SGSN, GGSN, HLR/HSS, and PCRF, it can communicate to a MTC UE 201-203 via various access networks 204-206 by simply supporting interfaces towards the access networks, without the need for total core network upgrade or update. For example, when a mobile carrier upgrades the network from 3G to LTE, VOC 210 can support the upgrade by supporting S1 interface from eNB 208 on top of Iu-ps interface from RNC 207, while all the rest of functionalities remain the same thus removing the need for extensive upgrade for mobile carriers.

In one embodiment, the VOC 210 includes, among others, subscription database 211, policy rule database 214, and context management module 217. Subscription database 211 has hierarchical structure to avoid the unnecessary duplication of the same information for a large number of UEs. For example, it has two levels of hierarchy providing group level and device level. Group level entry 212 contains common persistent subscription information specific to this group for all the devices that belong to this group, e.g. charging characteristics, priority, QoS profile, default VOC address, and access point name, etc. Device level entry 213 contains device specific information and optionally different value for the information in group level entry 212 in case there is a need to overwrite the group level value with another value for this specific device. Device level entry 213 includes, e.g., international mobile subscriber identifier (IMSI), group ID to which this device belongs to, external device ID, etc. Mobile carriers can create the groups first with common characteristics, e.g. health monitoring devices or smart meters, etc. Later when one or more device is provisioned, each device level entry 213 is created in the subscriber database. Each of this device level entry 213 will refer to the group(s) the device belongs to and inherit all the group level characteristics.

Context management module 214 also has hierarchical structure to avoid the unnecessary duplication of the same information for the UE contexts for a large number of UEs. For example, it has two levels of hierarchy providing group level and device level context. Group level context 215 contains common context information for all the devices that belong to this specific group, e.g. group level security key, group charging id, negotiated QoS profile, service area code, etc. Device level entry 216 contains device specific context information and optionally different value for the information in group level entry 215 in case there is a need to overwrite the group level value with another value for this specific device. Device level entry 216 includes, e.g., mobility state, PDP state, data forwarding sequence numbers, etc. Depending on the implementation and need, the VOC can dynamically create a group level context 215 that would be applied to all the devices that belong to this group, as soon as a service context for one or more devices of this group is created. Alternatively, VOC can combine the subscription profile and the information that is acquired from the device(s) over time to create and modify the group level context 215 information. Note that some or all of the components as shown in FIG. 2 may be implemented in hardware, firmware, software, or a combination there of.

Policy rule database 217 supports a hierarchical policy rule structure to minimize the duplication of policy for the user equipments that share the same characteristics in terms of handling user data and signaling data. In one embodiment, the policy rule database supports both user data and signaling handling policy rules in a hierarchical manner so that the group level policy 218 includes the policies that apply to all the user equipments that belong to that group, e.g. signaling command delivery mechanism (SMS or PDP context, etc.), PDP context timer, charging method, measurement method, gate status, etc. The device level policy 219 rules include those policies that would specifically apply to certain user equipment. The device level policy 219 is not necessarily configured in policy rules database, but the policy rule decision module can decide to apply specific rules for the specific user equipment based on other information available to it, e.g. mobility management and/or packet data protocol context information of the device at the given moment.

Figure 3:
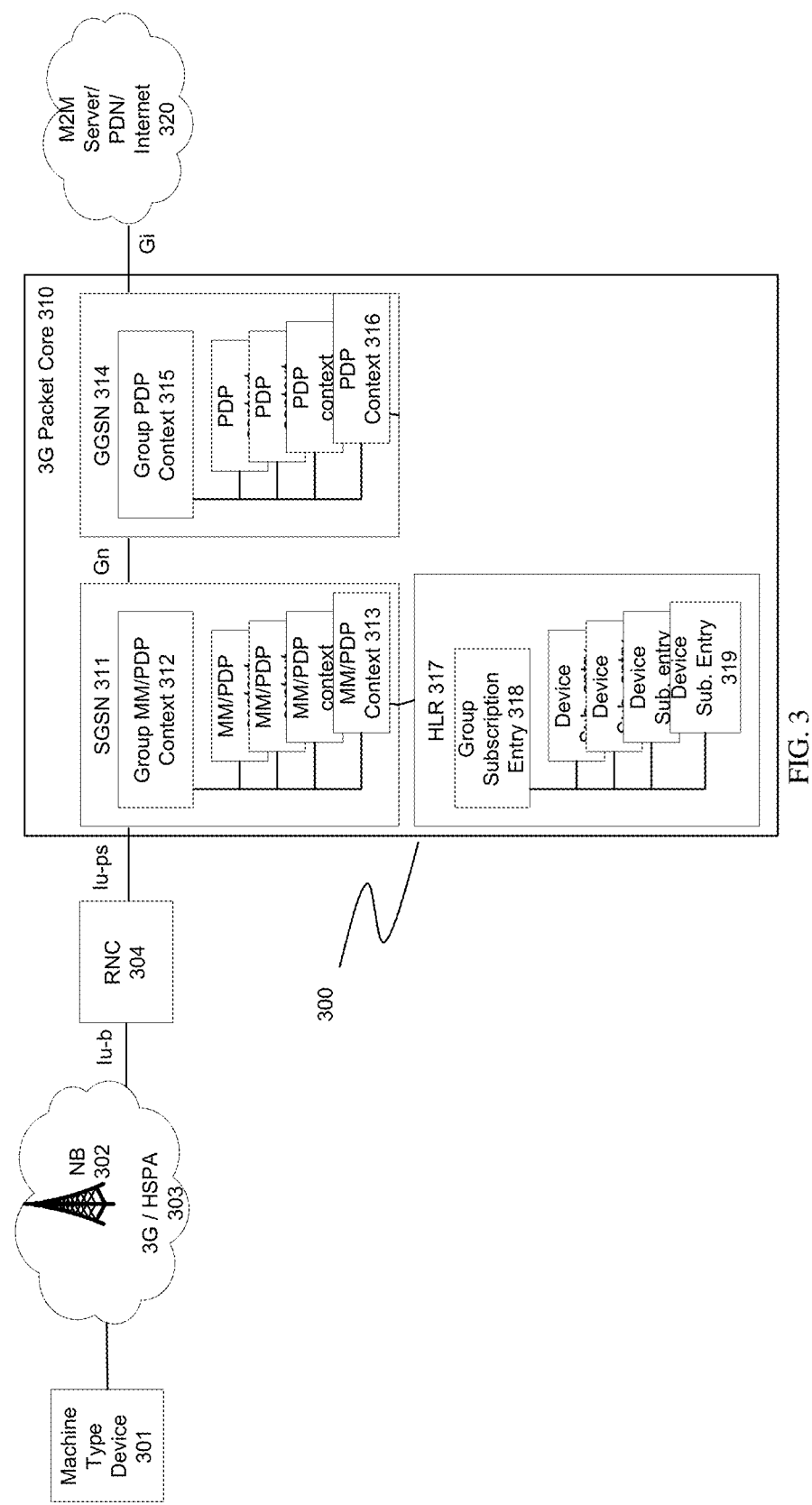
FIG. 3 is a block diagram illustrating a 3GPP packet system according to another embodiment.

FIG. 3 is a block diagram illustrating a network configuration according to another embodiment of the invention. Similar to configuration 200 of FIG. 2, configuration 300 includes hierarchical structure for the subscription information and the context. In one embodiment, the HLR 317 is enhanced to include group level and device level subscription information. Group level entry 318 contains common persistent subscription information for all the devices that belong to this specific group, e.g. charging characteristics, priority, QoS profile, and access point name, etc. Device level entry 319 contains device specific information and optionally different value for the information in group level entry 318 in case there is a need to overwrite the group level value with another value for this specific device. Device level entry 319 includes, e.g., international mobile subscriber identifier (IMSI), group ID to which this device belongs to, external device ID, etc. Mobile carriers can create the groups first with common characteristics, e.g. health monitoring devices or smart meters, etc. Later when one or more device is provisioned, each device level entry is created at subscriber database. Each of this device level entry 319 will refer to the group(s) the device belongs to and inherit all the group level characteristics.

Furthermore, in one embodiment, the SGSN 311 is enhanced to include group level and device level mobility management (MM) and packet data protocol (PDP) contexts information. GGSN 314 is enhanced to include group level and device level packet data protocol (PDP) context information. Group level context 312, 315 contains common context information for all the devices that belong to this specific group, e.g. group level security key, group charging id, negotiated QoS profile, service area code, etc. Device level entry 313, 316 contains device specific context information and optionally different value for the information in group level entry in case there is a need to overwrite the group level value with another value for this specific device. Device level entry 313,316 includes, e.g., mobility state, PDP state, data forwarding sequence numbers, etc. By supporting the hierarchical structure of subscription and context information, it is possible to provide more efficient ways to support large number of user equipments, especially when the user equipments share lots of same characteristics. Note that some or all of the components as shown in FIG. 3 may be implemented in hardware, firmware, software, or a combination there of.

Figure 4:
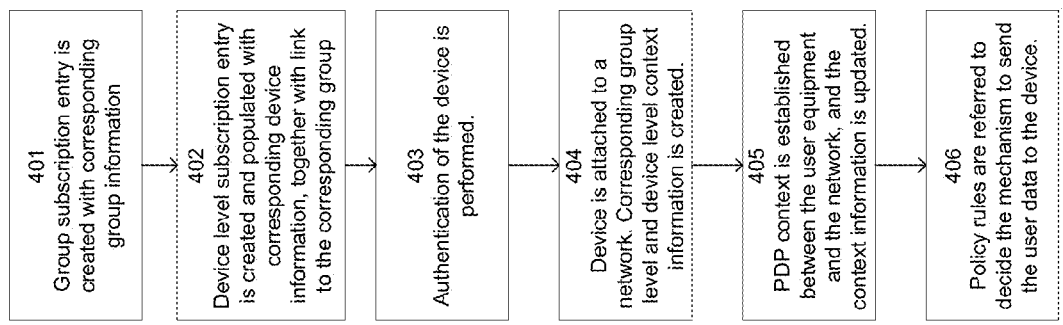
FIG. 4 is a flow diagram illustrating a process for routing 3GPP data packets according to one embodiment of the invention.

FIG. 4 is flow diagram illustrating a method for processing signaling and user data traffic in a GPRS network according to one embodiment of the invention. Note that method 400 may be performed by processing logic which may include software, firmware, hardware, or a combination thereof. For example, method 400 may be performed by VOC 210 of FIG. 2 or SGSN/GGSN/HLR 311, 314, 317 of FIG. 3. Referring to FIG. 4, at step 401, in response to a request to add one or more group entries to the network, a group entry is created and the entry is populated with corresponding group information.

At step 402, together with group creation or as a separate request at a later stage, in response to a request to add one or more user equipments to a network to serve this equipment at the network, an entry for the user equipment is created. Once user equipment entry is created, the entry is populated with corresponding device information. Furthermore, an internal logic will be created to link the group level information and device level information to be able to construct the full subscription information for any single user equipment.

At step 403, if a signaling message is received from user equipment via access network to attach the user equipment to the network, authentication for the user equipment is performed to determine if the user equipment is allowed to access the network. Group ID of the user equipment is retrieved to decide the group the user equipment belongs to and the subscription information for that group is retrieved to decide whether the device belongs to the right group that has an access to the network.

Once the authentication is successfully done, the user equipment is attached at the network at step 404. With the user equipment is attached, corresponding context information, e.g. mobility management context, is created based on the information exchanged during the network attachment procedure. Group level context information is populated for the group this user equipment belongs to, using the information available for this user equipment. When other user equipments from this group are added, those user equipments will by default inherit the same context information for this group until context information is updated with that user equipment specific information.

As soon as the user equipment is attached to the network or as a separate request at a later time, in response to a request to create a packet data protocol (PDP) context for data communication to the network or in response to a request to update the location information of the user equipment, at step 405, the device context information is updated to reflect the latest status of the device. If the mobility management or packet data protocol information update is happening for the whole group of user equipments, the group context information is updated to reflect this.

When there is a need to send user data to one or more user equipments at a later time, at step 406, a policy rule for the group is referred to decide, e.g. the mechanism how to send the data to the user equipment(s). Especially when there is a need to send the data to all the user equipments that belong to the group at the same time, a group level policy is referred just once and the policy is applied to all the user equipments. For example, if the policy says that the short message service (SMS) is to be used to send certain user data, then short message is sent with the destination set as all the user equipments that belong to the group.

Similarly, if the group policy is to send the user data via Wi-Fi access network then 3G radio access network, the user data will be sent to all the user equipments in that group via Wi-Fi as long as the user equipment is marked as attached to Wi-Fi network. For the user equipments that are not attached to the Wi-Fi access network but to 3G radio access network, the user data will be sent via 3G radio access network. It should be noted that both group level and device level context information and policy rules are referred to decide the right behavior for each procedure.

Figure 5:
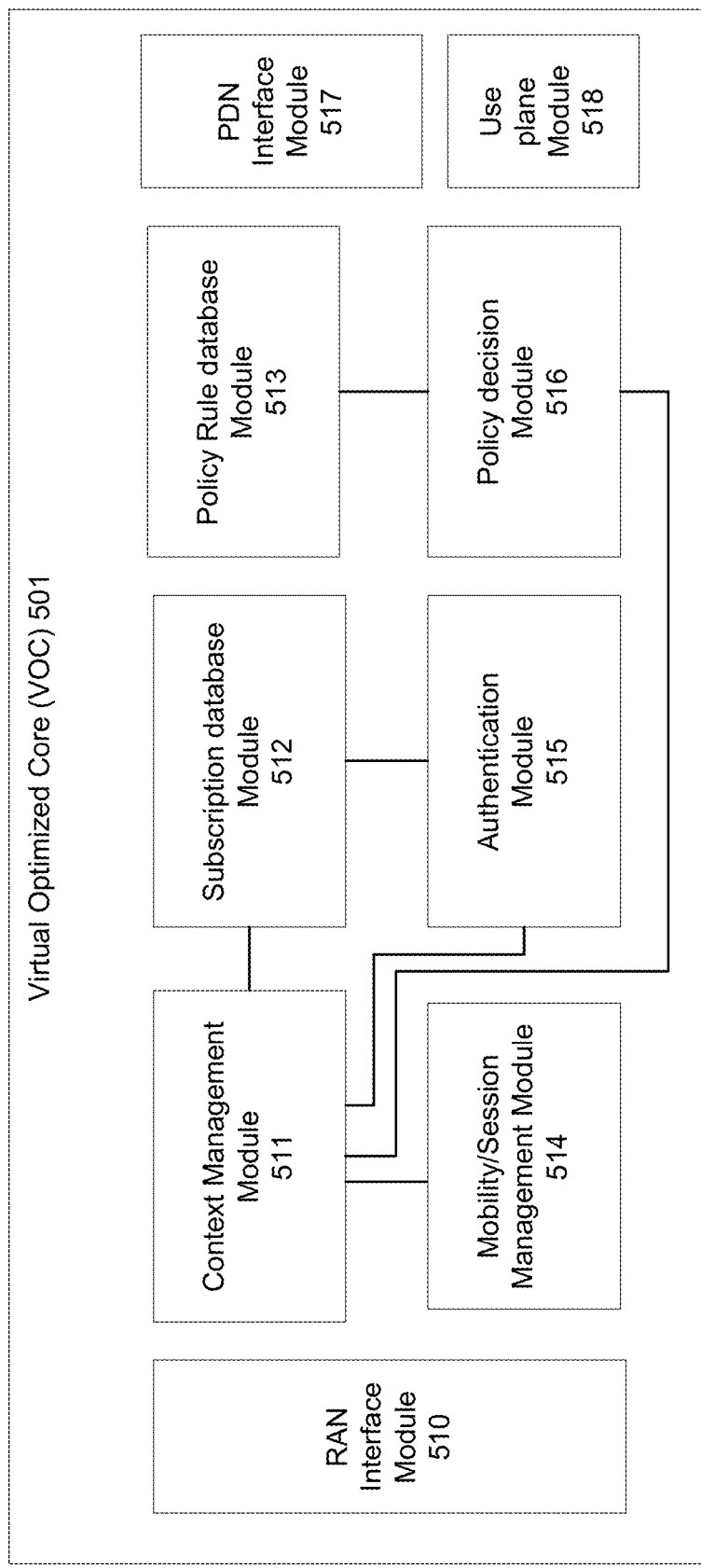
FIG. 5 is a block diagram illustrating a multi-function GW device according to one embodiment of the invention.

FIG. 5 is block diagram illustrating the virtual optimized core (VOC) 501 for processing signaling and user data traffic with hierarchical structure for subscription information and the contexts in a GPRS network according to one embodiment of the invention. Note that method 500 may be performed by processing logic which may include software, firmware, hardware, or a combination thereof.

In one embodiment, the VOC 501 includes, among others, access network interface module 510, PDN/application interface module 517, mobility/session management module 514, authentication module 515, user plane module 518, subscription database 512, policy rule database 513, policy decision module 516, and context management module 511. Access network interface module 510 is designed to support various access networks by providing standard interfaces towards each access network. PDN/Application interface module 517 is designed to provide communications towards the server at the enterprise and/or packet data network. Mobility/session management module 514 is in charge of creating/modifying/deleting sessions and performing the mobility procedures. Authentication module 515 authenticates the UE to grant access to the network. User plane module 518 handles and forwards the user data to the destination. Subscription database 512 stores all the persistent subscription related information for each UE. Policy rule database 513 stores the signaling and user data handling policy for UEs. Policy decision module 516 is designed to use the information in policy rule database, decide which policy is to be applied for each UE and tie the policy with corresponding signaling and use plane module. Context management module 511 is designed to manage all the dynamic contexts for the UE, including mobility and session context, and other modules have an access to the contexts for the processing.

Referring to FIG. 5, at subscription database module 512, in response to a request to add one or more group entries to the network, subscription database module 512 creates a group entry and populates the group entry with corresponding group information. Together with group creation or as a separate request at a later stage, in response to a request to add one or more user equipments to a network to serve this equipment at the network, the subscription data module 512 creates an entry for the user equipment, identifies the group the user equipment belongs to, and populate the database with corresponding device information. The subscription database module 512 stores an internal logic to link the group level information and device level information to be able to construct the full subscription information for any single user equipment.

At authentication module 515, if a signaling message is received from user equipment via access network to attach the user equipment to the network, an authentication module 515 is invoked to authenticate the user equipment to determine if the user equipment is allowed to access the network. The authentication module 515 refers to the subscription database module 512 to fetch the subscription information of the user equipment. The authentication module 515 retrieves the group ID the user equipment belongs to and retrieves the subscription information of that group to decide whether the device belongs to the right group that has an access to the network.

Once the authentication is successfully done, the user equipment is attached at the network. With the user equipment is attached, context management module 511 creates corresponding service context information, e.g. mobility management context, based on the information exchanged during the network attachment procedure. Context management module 511 populates the group level context information for the group this user equipment belongs to, using the information available for this user equipment.

As soon as the user equipment is attached to the network or as a separate request at a later time, in response to a request to create a packet data protocol (PDP) context for data communication to the network or in response to a request to update the location information of the user equipment, the context management module 511 updates the context information to reflect the latest status of the user equipment. If the mobility management or packet data protocol information update is happening for the whole group of user equipments, the context management module 511 updates the group context information to reflect the changes.

When there is a need to send user data to one or more user equipments at a later time, a policy rule decision module 516 refers to policy rules database 513 for the group policy rule for the group that is referred to, to decide, e.g. the mechanism how to send the data to the user equipment(s). Especially when there is a need to send the data to all the user equipments that belong to the group at the same time, a group level policy is referred just once and the policy is applied to all the user equipments. For example, if the policy says that the short message service (SMS) is to be used to send certain user data, then context management module will send the short message is sent with the destination set as all the user equipments that belong to the group.

Similarly, if the group policy is to send the user data via Wi-Fi access network then 3G radio access network, the user data will be sent to all the user equipments in that group via Wi-Fi as long as the user equipment is marked as attached to Wi-Fi network. For the user equipments that are not attached to the Wi-Fi access network but to 3G radio access network, the user data will be sent via 3G radio access network. It should be noted that both group level and device level context information and policy rules are referred to decide the right behavior for each procedure. Note that some or all components as shown herein may be implemented in hardware, firmware, software, or a combination thereof.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine-implemented method performed within a network element for processing network signaling of a packet core network, the method comprising:
    configuring a hierarchical subscription information in such a way there are group level subscription data and an user device level subscription data, and a logic to link the user device level subscription data to a group level subscription data;
    configuring a hierarchical policy information in such a way there are group level policy information and an user device level policy information, and a logic to link the user device level policy information to a group level policy information;
    providing access, by a first hierarchical subscription information, to the network to one or more remote nodes via access network interface logic;
    creating a hierarchical context information in such a way there are group level context information and a user device level context information, and a logic to link the user device level context information to a group level context information;
    updating a hierarchical context information for the whole group or one or more remote nodes upon change of remote node's status such as establishing a new session or changing the location;
    referring to a first hierarchical context information to handle control data and user data for the remote nodes that are given access by a first access logic;
    routing a network traffic to and from a remote node by a first hierarchical policy information and a first hierarchical context information.

2. The method of claim 1, wherein the components of the packet core network are one of a serving general packet radio service (GPRS) support node (SGSN) or Mobility Management Entity (MME) or serving gateway (S-GW), one of gateway general packet radio service (GPRS) support node (GGSN) or packet data network gateway (PDN-GW), home location register (HLR), and policy and charging rule function (PCRF) of the packet core network.

3. The method of claim 1, further comprising routing a network traffic to and from a remote node if the packet is received from a UMTS access network and destined to the packet data network wherein the access interface logic is configured to handle Iu-PS signaling protocol.

4. The method of claim 1, further comprising routing a network traffic to and from a remote node if the packet is received from a long term evolution (LTE) access network and destined to the packet data network wherein the access interface logic is configured to handle S1 signaling protocol.

5. The method of claim 1, further comprising routing a network traffic to and from a remote node if the packet is received from a Wi-Fi access network and destined to the packet data network wherein the access interface logic is configured to handle 802.1x signaling protocol and 802.11 signaling protocol.

6. The method of claim 1, further comprising: in response to a request for accessing the network from a remote node to the network, determining whether a remote node is associated with a group that has an access to the network; and in response to a request for establishing a network communication between a remote node and the network element, determining which group the remote node is associated with; constructing a context for the remote node from group level and device level context information; and applying a context information to a remote node.

7. A network element for processing network traffic of a packet network, the network element comprising:
    an access network interface unit to interface with a remote node via a various access network;
    a subscription database unit with a hierarchical structure to store the subscription information in a group level and device level entries where the group level entry stores a common information for all the devices that belong to this group;
    an authentication unit to grant access to the network to the remote node by referring a first subscription database unit to determine whether a remote node has a right to access network using group level and device level subscription information;
    a context management unit to create, maintain, and delete a dynamic context for a remote node with a hierarchical structure in a group level and device level where a group level context information contains a common context information for all the devices that belong to this group;
    a policy rule database unit with a hierarchical structure to store the policy information in a group level and device level information where a group level policy information stores a common policy information for all the devices that belong to this group;

a policy decision unit to determine how to handle the signaling and user traffic for a remote node by referring a first policy rule database unit; and an IP interface unit to route the packet to a destination to enable the packet to reach the destination on a packet data network.

8. The network element of claim 7, wherein the access network is further comprised of a 3G radio access network, high speed packet access (HSPA), long term evolution (LTE) access network or Wi-Fi access network.

9. The method of claim 8, wherein the access network interface unit is configured to handle an Iu-ps signaling protocol, S1 signaling protocol, and 802.1x signaling protocol and 802.11 signaling protocol.

10. The network element of claim 7, wherein the authentication unit is further configured to in response to a request for accessing the network from a remote node to the network, determining whether a remote node is associated with a group that has an access to the network; and in response to a request for establishing a network communication for a service between a remote node and the server in the network, determining which group the remote node is associated with and determining whether a remote node has a right to access the requested service.

11. The network element of claim 7, wherein the context management unit is further configured to
in response to a request for creating, updating, or deleting a network communication for a service between a remote node and the server in the network, constructing a context for the remote node from group level and device level context information.

12. A non-transitory machine-readable storage medium having instructions stored therein, which when executed by a machine, cause the machine to perform a method within a network element for processing network traffic of a packet network, the method comprising: configuring a hierarchical subscription information in such a way there are group level subscription data and an user device level subscription data, and a logic to link the user device level subscription data to a group level subscription data; configuring a hierarchical policy information in such a way there are group level policy information and an user device level policy information, and a logic to link the user device level policy information to a group level policy information; providing access, by the hierarchical subscription information, to the network to one or more remote nodes via access network interface logic; creating a hierarchical context information in such a way there are group level context information and a user device level context information, and a logic to link the user device level context information to a group level context information; updating a hierarchical context information for the whole group or one or more remote nodes upon change of remote node's status such as establishing a new session or changing the location; referring to a first hierarchical context information to handle control data and user data for the remote nodes that are given access by a first access logic; routing a network traffic to and from a remote node by a first hierarchical policy information and a first hierarchical context information.

13. The non-transitory machine-readable storage medium of claim 12, wherein the access network interface logic is further configured to include support of a 3G radio access network, high speed packet access (HSPA), long term evolution (LTE) access network or Wi-Fi access network.

14. The non-transitory machine-readable storage medium of claim 13, wherein the access network interface logic is further configured to handle an Iu-ps signaling protocol, S1 signaling protocol, 802.1x signaling protocol and 802.11 signaling protocol.

15. The non-transitory machine-readable storage medium of claim 14, wherein the method further comprises, in response to a request for accessing the network from a remote node to the network, determining whether a remote node is associated with a group that has an access to the network; and in response to a request for establishing a network communication between a remote node and the network element, determining which group the remote node is associated with; constructing a context for the remote node from group level and device level context information; and applying a context information to a remote node.

* * * * *